(12) United States Patent
Binder et al.

(10) Patent No.: US 7,775,757 B2
(45) Date of Patent: Aug. 17, 2010

(54) DEVICE FOR RECEIVING AND FOR TRANSPORTING AN ARTICLE

(75) Inventors: Jan Binder, Esslingen (DE); Steffen Mayer, Rutesheim (DE); Thomas Unmuth, Stuttgart (DE)

(73) Assignee: MULTIVAC Sepp Haggenmueller GmbH & Co. KG, Wolfertschwenden (DE)

( * ) Notice: Subject to any disclaimer, the term of this patent is extended or adjusted under 35 U.S.C. 154(b) by 0 days.

(21) Appl. No.: 12/232,272

(22) Filed: Sep. 12, 2008

(65) Prior Publication Data
US 2009/0097949 A1    Apr. 16, 2009

(30) Foreign Application Priority Data
Sep. 13, 2007    (DE) .................. 10 2007 045 042

(51) Int. Cl.
*B65G 47/90*    (2006.01)
(52) U.S. Cl. ................. 414/796; 414/796.5; 414/796.9; 198/597
(58) Field of Classification Search ................. 198/416, 198/596, 597; 414/796, 796.2, 796.5, 796.9; 271/268
See application file for complete search history.

(56) References Cited

U.S. PATENT DOCUMENTS

| | | | |
|---|---|---|---|
| 4,746,255 A | 5/1988 | Roccabianca et al. | |
| 4,911,608 A * | 3/1990 | Krappitz et al. | 414/796 |
| 5,040,942 A * | 8/1991 | Brinker et al. | 414/796 |
| 5,087,169 A * | 2/1992 | Tubke | 414/792.9 |
| 5,102,292 A * | 4/1992 | Brinker et al. | 414/796 |
| 5,380,147 A * | 1/1995 | Hess et al. | 414/796 |
| 5,391,050 A * | 2/1995 | Gatteschi | 414/796 |
| 5,524,747 A * | 6/1996 | Wohlfahrt et al. | 198/512 |
| 6,332,750 B1 * | 12/2001 | Donner et al. | 414/796.9 |

FOREIGN PATENT DOCUMENTS

| | | |
|---|---|---|
| DE | 30 24 133 A1 | 1/1982 |
| DE | 196 26 802 A1 | 1/1998 |
| DE | 198 47 932 A1 | 4/2000 |
| DE | 10 2005 045 215 A1 | 4/2007 |
| DE | 602 18 316 T2 | 10/2007 |
| EP | 1 767 477 A1 | 3/2007 |
| GB | 2 435 257 A | 8/2007 |
| WO | WO 99/00306 | 1/1999 |
| WO | WO 2005/051812 | 8/2007 |
| WO | WO 2007/093774 A1 | 8/2007 |

* cited by examiner

*Primary Examiner*—Douglas A Hess
(74) *Attorney, Agent, or Firm*—Breneman & Georges

(57) ABSTRACT

A device for receiving and for transporting an article having a receiving plate which is slid under the article is provided in which the improvement involves a more effective way for an article to rest on the receiving plates during transportation. A more effective way for an article to rest on a receiving plate that is slid under the article is the addition of a hold down element.

14 Claims, 2 Drawing Sheets

DEVICE FOR RECEIVING AND FOR TRANSPORTING AN ARTICLE

CROSS REFERENCE TO RELATED APPLICATIONS

The subject matter of this application is related to the subject matter of U.S. application Ser. No. 12/232,273 titled, "Device For Receiving And Transporting An Article" filed Sep. 12, 2008 and U.S. application Ser. No. 12/232,274 titled, "Device For Receiving And Transporting An Article" filed Sep. 12, 2008.

BACKGROUND OF THE INVENTION (1) Field of the Invention

The invention relates to a device for receiving and for transporting an article which has at least one receiving plate which is slid under the article.

(2) Description of Related Art Including Information Disclosed Under 37 C.F.R. 1.97 and 1.98.

Devices for receiving and for transporting an article, which devices have a receiving plate which is slid under the article, are known in the art, for example from document U.S. Pat. No. 4,746,255 A. The receiving plate is in this case surrounded by a belt which is fastened to a mount so that, on displacement of the receiving plate, the mount does not move therewith and the region of the belt on which the article rests maintains its position relative to the article on displacement of the receiving plate under the article.

BRIEF SUMMARY OF THE INVENTION

The object of the invention is to improve a device according to the prior art in such a way that the article rests more effectively on the receiving plates during transportation of the device.

Starting from a device for receiving and transporting an article having at least one receiving plate this object is achieved by having a hold-down element which holds the article down on at least one receiving plate.

Accordingly, a device according to the invention is distinguished in that a hold-down element, which holds the article down on at least one receiving plate, is provided.

In this way, the article is fixed more effectively and cannot slip, in particular during acceleration of the devices.

Additional advantageous embodiments and developments of the invention are achieved by having a resilient belt attached to at least one component which moves with the receiving plate and to at least one component which does not move with the receiving plate and forms at least one loop type region which holds down the article during the displacement of the receiving plate, by having the resilient belt fastened roughly centrally above the article to a mount to form two loop-type regions upon displacement of a receiving plate, by having at least one receiving plate surrounded by a belt which is fastened to a mount which upon displacement of the receiving plate does not move therewith so that on displacement of the receiving plate under the article the region of the belt on which the article rests maintains its position relative to the article, having a receiving plate inclined obliquely, preferably at an angle (α) of from 1° to 15° relative to the surface (A) on which an article (G) rests, having a friction-reducing means at the edge of the receiving plate and having two receiving plates surrounded by one belt and moved toward and away from each other by way of the direction of displacement.

Thus, one particular embodiment of the invention is distinguished in that a resilient belt is attached to at least one component which moves with the receiving plate and to at least one component which does not move with the receiving plate and forms, during the displacement of the receiving plate under the article, at least one loop-type region which holds down the article.

This configuration of the hold-down element reduces on the one hand the risk of slippage on movement of the device, the belt being lowered simultaneously with the movement of the receiving plates and not contacting the article until the last phase of the moving-toward-one-another of the receiving plates, i.e. at a point in time at which the article practically already rests substantially on the receiving plates. This slight resilient pressing of the article against the receiving plate or the receiving plates is in addition particularly gentle on the article to be transported.

In a development of this embodiment, the resilient belt is fastened, roughly centrally above the article, to a mount, so that on displacement of one receiving plate one loop-type region is formed and on displacement of two receiving plates two loop-type regions are formed. This produces a hold-down element which, in each receiving plate, acts on the article at the location where a receiving plate is provided on the underside.

Advantageously, the at least one receiving plate is surrounded by a belt which is fastened to a mount which, on displacement of the receiving plate, does not move therewith, so that on displacement of the receiving plate under the article, the region of the belt on which the article rests maintains its position relative to the article.

The belt, which surrounds the receiving plate and moves relative to the receiving plates when the article is reached under, thus performs during the reaching-under, i.e. while the receiving plate slides under the article to be received, with its upper region on which the article rests no relative movement in relation to the article to be received, whereas the belt is displaced from below, i.e. in its region below the receiving plate, under said receiving plate and in this case also slides from below under the article, raises it by the amount of the thickness of the belt and the receiving plate, but without exerting with its upper region on the article to be received a frictional force which can compress or otherwise impair said article.

In a development of the invention, the receiving plates are positioned obliquely relative to the receiving surface, so that the belts slide on the receiving surface merely along the region of deflection around the edges of the receiving plates. This significantly reduces the sliding friction between the belt and the receiving surface from which the article is received.

Furthermore, it is possible to reduce the friction between the edges of the receiving plates and the belts by providing low-friction means at the edges. Lowering the friction acting on the belts allows the loading, and thus the wear, of the belts to be reduced.

BRIEF DESCRIPTION OF THE SEVERAL VIEWS OF THE DRAWING(S)

An exemplary embodiment of the invention is illustrated in the drawings and will be described hereinafter in greater detail with reference to the figures in which specifically.

DETAILED DESCRIPTION OF THE INVENTION INCLUDING BEST MODE

Figure 1:
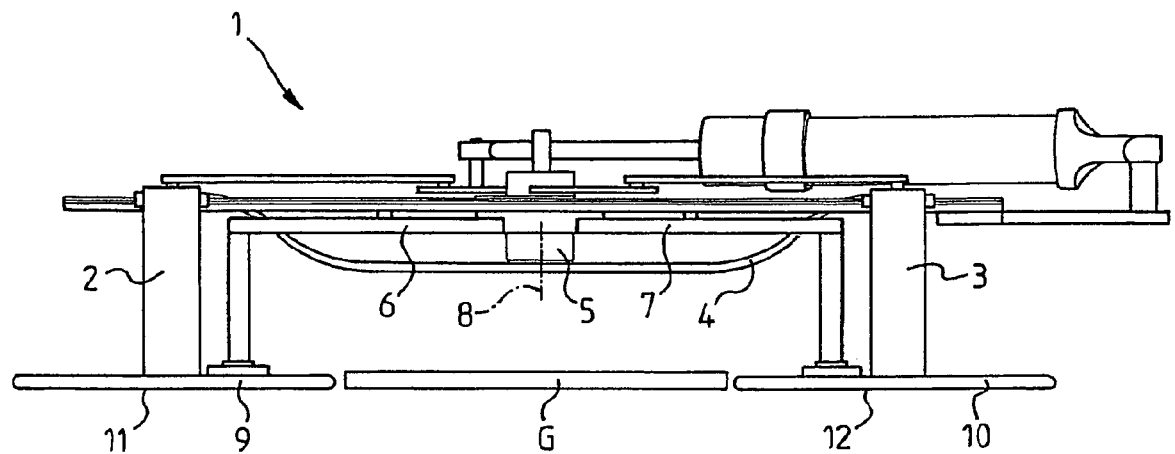
FIG. 1 is a side view of a device according to the invention prior to the receiving of an article.
Figure 2:
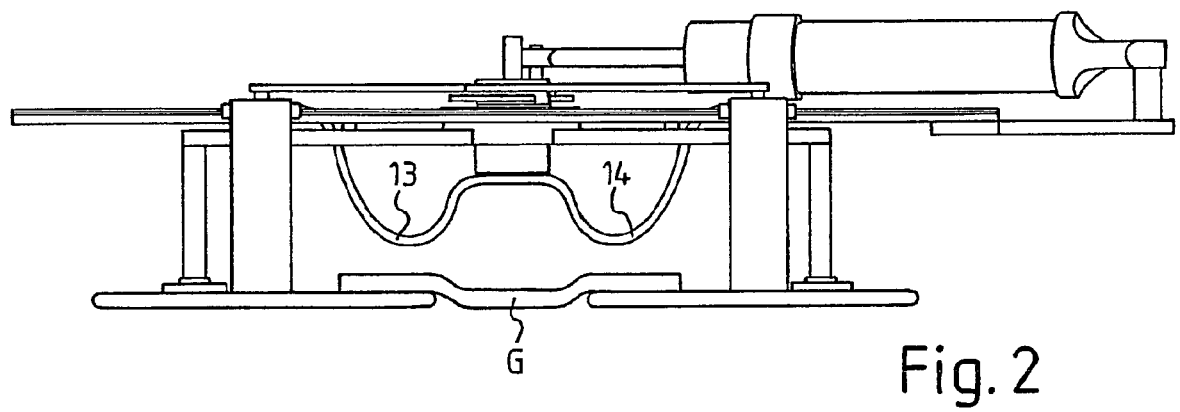
FIG. 2 is a side view of a device according to FIG. 1 during the receiving of the article.
Figure 3:
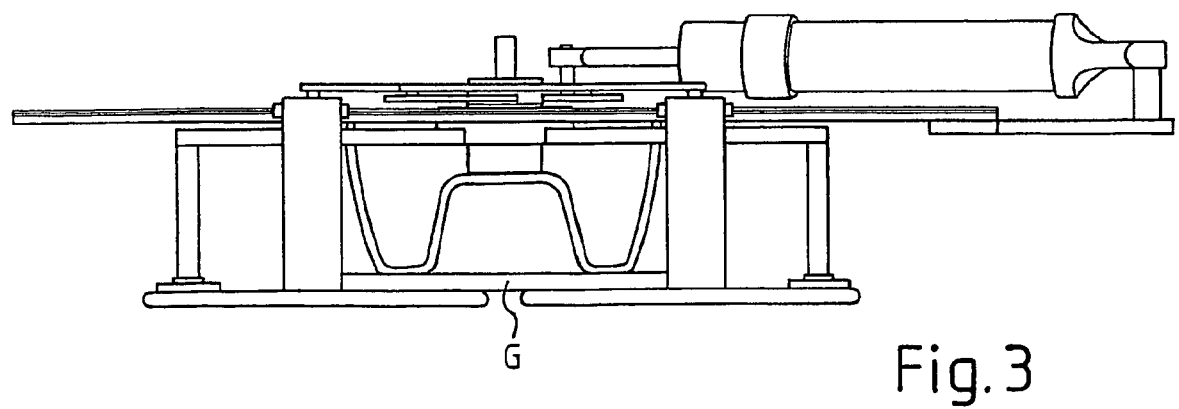
FIG. 3 shows an embodiment of the invention with the article received.

Two brackets 2, 3, to which a resilient belt 4 is fastened, are provided in a device 1 according to FIG. 1. The resilient belt is also fastened to the non-moving part 5 in connection between two struts 6, 7 by means of a screw 8. If the two receiving plates 9, 10, around each of which a belt 11, 12 is attached to compensate for a relative movement between the receiving plates 9, 10 and the article G when the article G is received, move toward each other, the two loop-type regions 13, 14 of the resilient belt 4 are lowered onto the outer regions of the article G (cf. FIG. 2).

The lowering until contact is achieved does not take place until the last phase of the moving-toward-each-other of the receiving plates 9, 10, i.e. at a point in time at which the article G practically already rests substantially on the receiving plates. The slight resilient pressing of the article G against the receiving plates prevents the article G from slipping during the transportation of the device 1.

Figure 4:
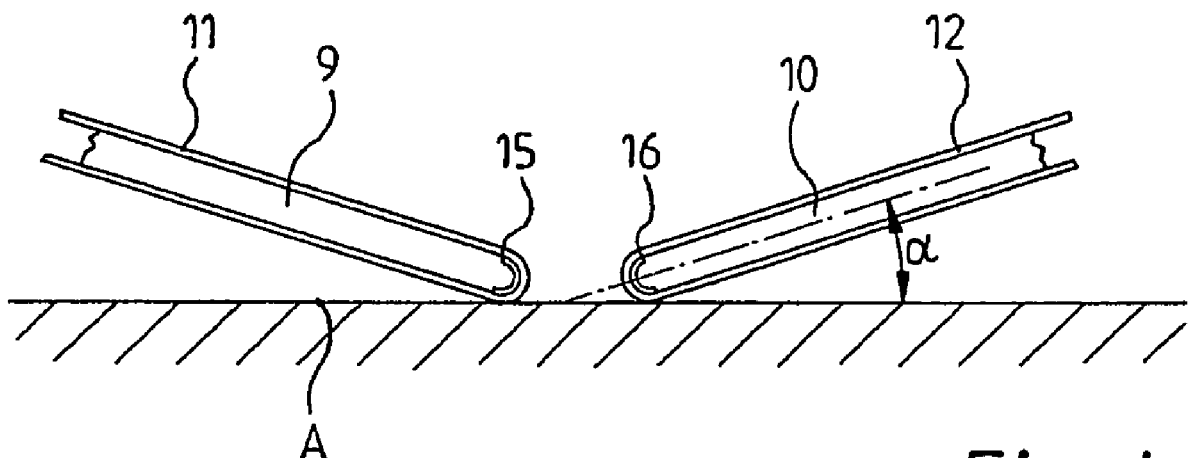
FIG. 4 is a detailed side view of a further embodiment of the invention.

In the particular embodiment according to FIG. 4, the arrangement of the receiving plates 9, 10 with the belts 11, 12 to be surrounded is modified in that the receiving plates 9, 10 are positioned obliquely relative to the receiving surface A which is intended to receive the article G, so that the belts 11, 12 slide on the receiving surface A only along the region of deflection around the edges 15, 16. The angle α is preferably in a range of from 1-15°.

Two receiving plates 9, 10 are provided in the illustrated exemplary embodiment. The device 1 according to the invention can however also operate with just one receiving plate, wherein the hold-down element can again be formed by the resilient belt 4 modified accordingly, so that only one loop-type regions 13 is formed above the associated receiving plate 9.

LIST OF REFERENCE NUMERALS

1 Device
2 Bracket
3 Bracket
4 Resilient belt
5 Connection
6 Strut
7 Strut
8 Screw
9 Receiving plate
10 Receiving plate
11 Belt
12 Belt
13 Loop-type region
14 Loop-type region

What is claimed is:

1. In a device for receiving and transporting an article (G) away from a surface, the device having at least one receiving plate (9, 10) which is slid under the article (G) to move the article away from the surface, wherein the improvement comprises a flexible hold-down element connected to a non moving component, whereby the flexible hold-down element forms a loop region, whereby the flexible hold-down element holds the article down on the at least one receiving plate and is actuated by a lever connected to a pivotal central point mount of the non moving component, whereby said lever drives and coordinates the operation of said flexible hold-down element and said at least one receiving plate.

2. The device according to claim 1, wherein said flexible hold-down element is a resilient belt (4) attached at one end to at least one component (2, 3) which moves with the receiving plate (9, 10) and attached at the other end to at least one component (5) which does not move with the receiving plate (9, 10) said resilient belt forming at least one loop-type region (13,14) during the displacement of the receiving plate (9, 10) under the article (G) which holds down the article (G).

3. The device according to claim 1 or 2 wherein the flexible hold-down element or the resilient belt (4) is fastened to the mount of the pivotal central point above the article (G) and forms two loop-type regions (13, 14) on a displacement of the receiving plate.

4. The device according to claim 1 or 2 wherein at least one receiving plate (9, 10) is surrounded by a belt (11, 12).

5. The device according to claim 1 or 2 wherein the at least one receiving plate (9, 10) is inclined obliquely, preferably at an angle (α) of from 1-15°, relative to the surface (A) on which the article (G) rests.

6. The device according to claim 1 or 2 wherein a friction-reducing means is provided at an edge (15, 16) of the at least one receiving plate (9, 10).

7. The device according to claim 1 or 2 wherein said at least one receiving plate is two receiving plates (9, 10), which are each surrounded by a belt (11, 12) and are moved toward and away from each other by the lever.

8. An apparatus for receiving and transporting an article comprising:
(a) a stationary frame having a stationary portion and a slidable portion;
(b) at least one slidable receiving plate for sliding under an article slidably attached to said stationary frame;
(c) a pivotal mount disposed at a substantially central point on said stationary frame;
(d) a flexible hold-down element attached to said stationary portion of said stationary frame and attached to a slidable portion of said stationary frame; and
(e) a single drive lever connected to said pivotal mount to control the operation of both said at least one slidable receiving plate and said flexible hold-down element.

9. The apparatus of claim 8 wherein said flexible hold-down element is a resilient belt.

10. The apparatus of claim 8 further comprising a friction-reducing element disposed at an edge of said at least one slidable receiving plate.

11. The apparatus of claim 8 wherein said at least one slidable receiving plate is inclined at an angle of about 1 to 15 degrees relative to the surface of the article being received and transported.

12. The apparatus of claim 8 wherein said single drive lever is connected to a piston-cylinder combination.

13. The apparatus of claim 8 wherein said at least one slidable receiving plate is two slidable receiving plates which are moved toward and away from each other by said single drive lever.

14. The apparatus of claim 13 wherein said flexible hold-down element is attached to said two slidable receiving plates and a non pivotal portion of said pivotal mount.

* * * * *